US012327387B2

(12) United States Patent
Hirokawa

(10) Patent No.: US 12,327,387 B2
(45) Date of Patent: Jun. 10, 2025

(54) IMAGE PROCESSING APPARATUS, IMAGE PROCESSING METHOD, AND RECORDING MEDIUM

(71) Applicant: NEC Corporation, Tokyo (JP)

(72) Inventor: Akira Hirokawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 394 days.

(21) Appl. No.: 17/868,133

(22) PCT Filed: Feb. 10, 2020

(86) PCT No.: PCT/JP2020/005107
§ 371 (c)(1),
(2) Date: Jul. 19, 2022

(87) PCT Pub. No.: WO2021/161375
PCT Pub. Date: Aug. 19, 2021

(65) Prior Publication Data
US 2023/0186585 A1 Jun. 15, 2023

(51) Int. Cl.
*G06V 10/10* (2022.01)
*G06V 10/24* (2022.01)
(Continued)

(52) U.S. Cl.
CPC ............ *G06V 10/16* (2022.01); *G06V 10/242* (2022.01); *G06V 10/26* (2022.01);
(Continued)

(58) Field of Classification Search
CPC ........ G06V 10/10; G06V 10/16; G06V 10/22; G06V 10/24; G06V 10/26; G06V 10/242;
(Continued)

(56) References Cited

U.S. PATENT DOCUMENTS

2002/0141620 A1* 10/2002 Monden ............ G06V 40/1347
382/115
2003/0118215 A1   6/2003 Mizoguchi
(Continued)

FOREIGN PATENT DOCUMENTS

| JP | 2003-196659 A | 7/2003 |
| JP | 2004-030191 A | 1/2004 |
| WO | 2005/086091 A1 | 9/2005 |

OTHER PUBLICATIONS

International Search Report for PCT Application No. PCT/JP2020/005107, mailed on Apr. 21, 2020.

*Primary Examiner* — Oneal R Mistry
*Assistant Examiner* — Duy Tran

(57) ABSTRACT

An image processing apparatus includes an image division unit, an image processing unit, and an integration unit. The image division unit divides a palm print image into a plurality of divisional images. The image processing unit determines a valid region in each of the plurality of divisional images by using a fingerprint model, performs image processing that extracts core lines in each valid region, and generates respective processed divisional images corresponding to the divisional images. The integration unit generates an entire processed image corresponding to an entire of the palm print image by integrating the processed divisional images.

8 Claims, 9 Drawing Sheets

(51) Int. Cl.
*G06V 10/26* (2022.01)
*G06V 40/12* (2022.01)
*G06V 40/13* (2022.01)

(52) U.S. Cl.
CPC ...... *G06V 40/1318* (2022.01); *G06V 40/1359* (2022.01); *G06V 40/1376* (2022.01)

(58) Field of Classification Search
CPC ...... G06V 10/25; G06V 10/255; G06V 10/44; G06V 40/107; G06V 40/12; G06V 40/1318; G06V 40/1347; G06V 40/1359; G06V 40/1365; G06V 40/1376; G06V 2201/033; G06V 30/1463; G06V 30/148; G06T 7/10; G06T 7/11; G06T 7/12; G06T 3/60; G06T 3/602; G06T 2219/2016
See application file for complete search history.

(56) References Cited

U.S. PATENT DOCUMENTS

| | | | |
|---|---|---|---|
| 2005/0041885 A1* | 2/2005 | Russo | G06V 40/1335 345/157 |
| 2007/0189586 A1 | 8/2007 | Monden | |
| 2009/0022401 A1* | 1/2009 | Huang | A61B 5/1171 382/254 |
| 2010/0046810 A1* | 2/2010 | Yamada | G06V 40/1359 382/299 |
| 2014/0294261 A1* | 10/2014 | Abe | G06V 40/12 382/124 |
| 2017/0004622 A1 | 1/2017 | Adsumilli et al. | |

\* cited by examiner

<IMAGE DIVISION>

BL

PSEUDO TERMINAL NODE LINE

180 DEGREE ROTATION

BLx

PSEUDO TERMINAL NODE LINE

BL

PSEUDO TERMINAL NODE LINE    INVALID REGION

BLx

INVALID REGION    PSEUDO TERMINAL NODE LINE

IMAGE PROCESSING APPARATUS, IMAGE PROCESSING METHOD, AND RECORDING MEDIUM

This application is a National Stage Entry of PCT/JP2020/005107 filed on Feb. 10, 2020, the contents of all of which are incorporated herein by reference, in their entirety.

TECHNICAL FIELD

The present disclosure relates to a process of a palm print image.

BACKGROUND ART

As one method of a biometric verification, a palm print verification is known. In the palm print verification, feature points in a palm print image of a specific person are extracted and stored in a palm print database. At a time of matching of palm prints, feature points are extracted from a palm print image of a subject person, and it is determined whether or not the subject person matches a specific person based on a degree of similarity with the feature points of each person registered in the palm print database. Patent Document 1 describes a technique for matching feature data of the palm print.

PRECEDING TECHNICAL REFERENCES

Patent Document

Patent Document 1: Japanese Laid-open Patent Publication No. 2004-30191

SUMMARY

Problem to be Solved by the Invention

In a fingerprint verification which is an example of a biometric verification, feature points are similarly extracted from a fingerprint image. At this time, as a pre-process for extracting the feature points, a process is performed in which a blurred region in the fingerprint image is made to be an invalid region and a clear region is made to be a valid region (hereinafter, referred to as a "region determination"). Furthermore, as another pre-process, a process for extracting core lines from ridges in the valid region (hereinafter referred to as "core line extraction") is performed. A "core line" is a line which width is constant representing a ridge line in a fingerprint image. Accordingly, feature points are extracted based on data of core lines obtained from the valid region in the fingerprint image. In a case of the fingerprint verification, the pre-processes for the region determination and the core line extraction, which are described above, have been basically carried out manually by experienced workers.

Since a basic principle of extracting feature points and matching the feature points in a palm print verification is similar to that of fingerprint verification, it is desirable to perform region determination and core line extraction as pre-processes for feature extraction as described above. However, it has been realistically impossible to manually carry out the region determination and the core line extraction as in the case of the fingerprint image, because a palm print image has a wider region and an amount of data is enormous, compared with a fingerprint image.

It is one object of the present disclosure to provide an image processing apparatus capable of efficiently determining a valid region and extracting core lines, with respect to a palm print image without depending on manual operations.

Means for Solving the Problem

According to an example aspect of the present disclosure, there is provided an image processing apparatus including:
an image division unit configured to divide a palm print image into a plurality of divisional images;
an image processing unit configured to determine a valid region in each of the divisional images by using a fingerprint model, perform image processing that extracts core lines in each of valid regions, and generate respective processed divisional images corresponding to the divisional images; and
an integration unit configured to generate an entire processed image corresponding to an entire of the palm print image by integrating the processed divisional images.

According to another example aspect of the present disclosure, there is provided an image processing method, including:
dividing a palm print image into a plurality of divisional images;
determining a valid region in each of the divisional images by using a fingerprint model, performing image processing that extracts core lines in each of valid regions, and generating respective processed divisional images corresponding to the divisional images; and
generating an entire processed image corresponding to an entire of the palm print image by integrating the processed divisional images.

According to still another example aspect of the present disclosure, there is provided a recording medium storing a program, the program causing a computer to perform a process including:
dividing a palm print image into a plurality of divisional images;
determining a valid region in each of the divisional images by using a fingerprint model, performing image processing that extracts core lines in each of valid regions, and generating respective processed divisional images corresponding to the divisional images; and
generating an entire processed image corresponding to an entire of the palm print image by integrating the processed divisional images.

Effect of the Invention

According to the present disclosure, it is possible to efficiently determine a valid region and extract core lines for a palm print image without depending on manual operations.

EXAMPLE EMBODIMENTS

In the following, example embodiments will be described with reference to the accompanying drawings.

First Example Embodiment

[Image Processing Apparatus]

Figure 1:
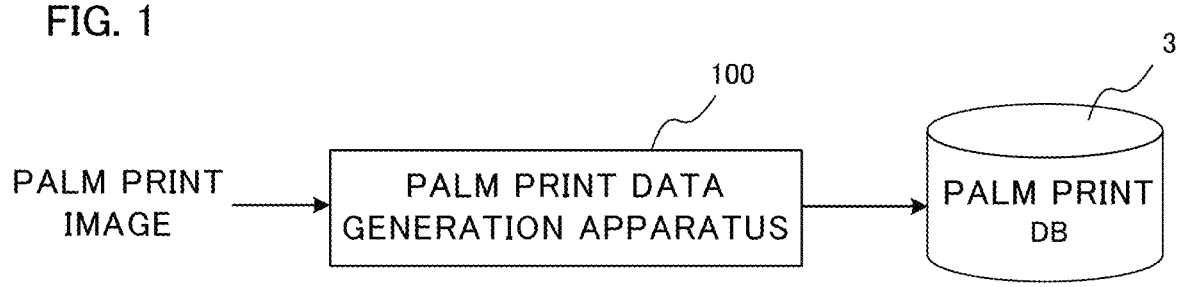
FIG. 1 illustrates an outline of a palm print data generation apparatus according to a first example embodiment.

FIG. 1 illustrates an outline of a palm print data generation apparatus according to a first example embodiment of an image processing apparatus of the present disclosure. A palm print image of a person to register a palm print is input to the palm print data generation apparatus 100. The palm print data generation apparatus 100 performs image processing on the input palm print image and generates a palm print image to which the image processing has been performed. In detail, the palm print data generation apparatus 100 determines a valid region in the palm print image, draws core lines in the valid region, and generates a palm print image after the image processing. The "valid region" is regard as a region where an image of a palm print is clear and is used to match the palm print in the palm print verification. On the other hand, a region where an image of the palm print is obscure is called an "invalid region".

Next, the palm print data generation apparatus 100 extracts the image points from the palm print image after the image processing, generates palm print data representing the feature points, and registers the palm print data in the palm print database (hereinafter, a "database" is referred to as a "DB"). The palm print data registered in the palm print DB 3 are used to identify a person by the palm print verification. That is, a subject person is determined to be a registered person in a case where feature point data extracted from a palm print image of the subject person are matched with palm print data of each of persons registered in the palm print DB 3 and a correspondence acquired by the matching indicates a predetermined reference value or more.

[Hardware Configuration]

Figure 2:
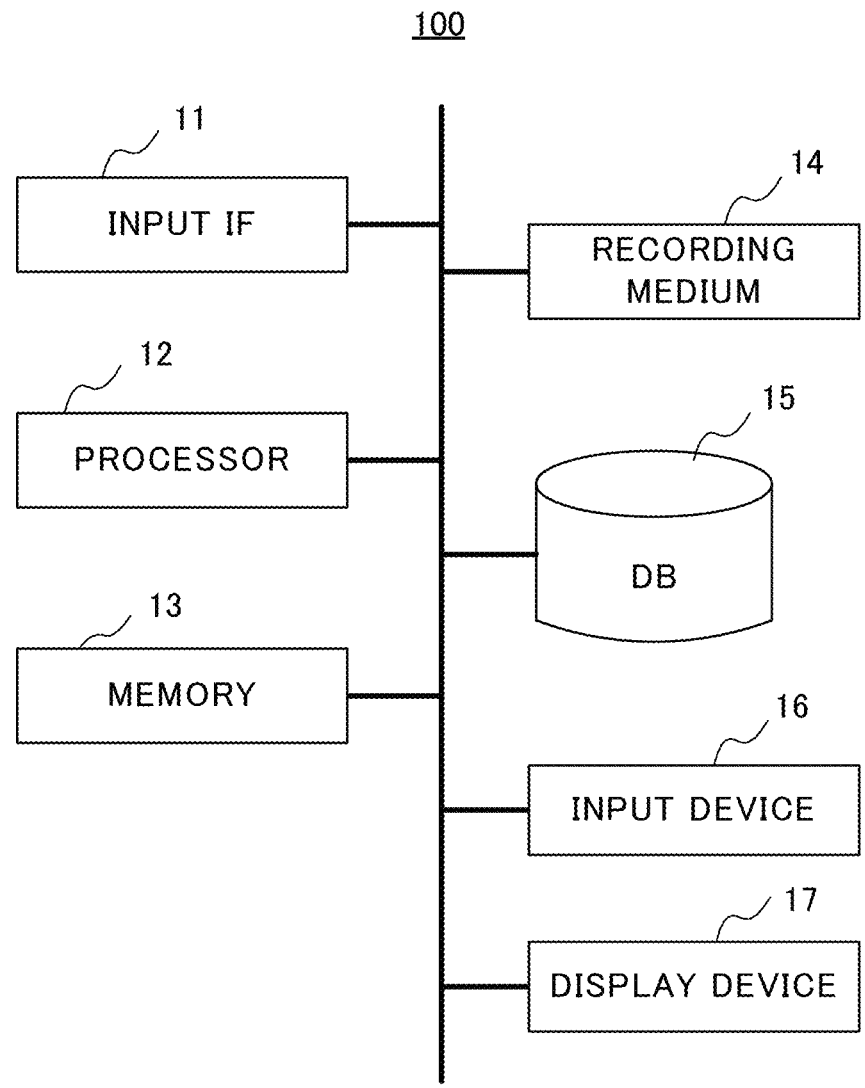
FIG. 2 is a block diagram illustrating a hardware configuration of the palm print data generation apparatus.

FIG. 2 is a block diagram illustrating a hardware configuration of the palm print data generation apparatus 100. As illustrated, the palm print data generation apparatus 100 includes an input IF (InterFace) 11, a processor 12, a memory 13, a recording medium 14, a database (DB) 15, an input device 16, and a display device 17.

The input IF 11 inputs and outputs data. In detail, the input IF 11 acquires palm print image and outputs the palm print data generated by the palm print data generation apparatus 100 based on the palm print image.

The processor 12 is a computer such as a CPU (Central Processing Unit) or a GPU (Graphics Processing Unit), and controls the entire palm print data generation apparatus 100 by executing programs prepared in advance. In particular, the processor 12 performs a palm print data generation process which will be described later.

The memory 13 is formed by a ROM (Read Only Memory), a RAM (Random Access Memory), or the like.

The memory 13 stores various programs to be executed by the processor 12. The memory 13 is also used as a working memory during executions of various processes by the processor 12.

The recording medium 14 is a non-volatile and non-transitory recording medium such as a disk-shaped recording medium, a semiconductor memory, and is formed to be detachable from the palm print data generation apparatus 100. The recording medium 14 records various programs executed by the processor 12.

The DB 15 stores palm print images input from the input IF 11. In addition, the DB 15 stores a core line extraction model that determines the valid region of the palm print image and extracts core lines. This core extraction model is a model trained as a core extraction model with respect to the fingerprint image.

The input device 16 is, for example, a keyboard, a mouse, a touch panel, or the like, and is used in a case where a user performs necessary instructions and inputs in connection with processes by the palm print data generation apparatus 100. The display device 17 is, for example, a liquid crystal display, and displays a determination result of the valid region and the invalid region, drawn core lines, and the like.

[Function Configuration]

Figure 3:
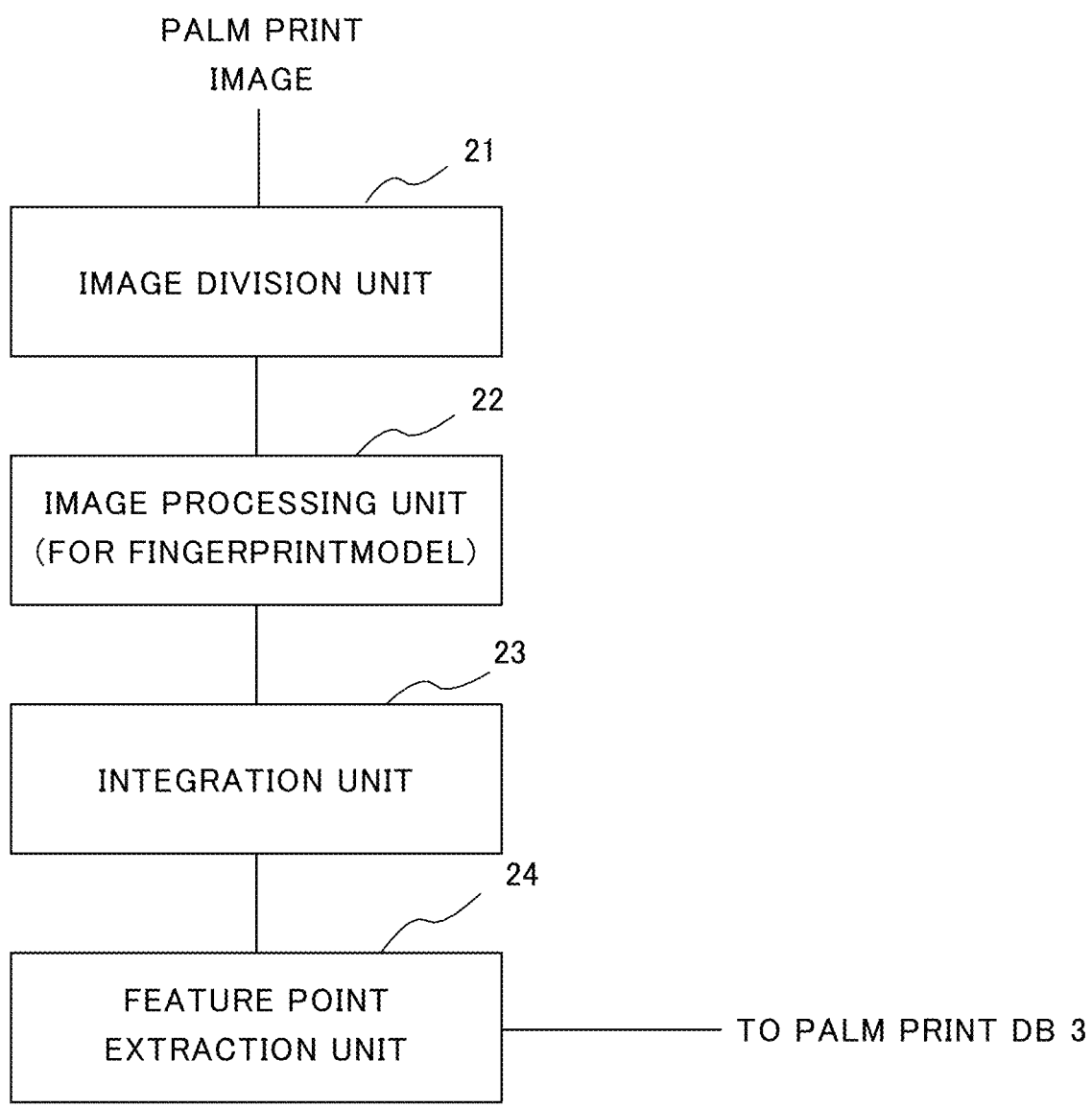
FIG. 3 is a block diagram illustrating a functional configuration of the palm print data generation apparatus.

FIG. 3 is a block diagram illustrating a functional configuration of the palm print data generation apparatus 100. The palm print data generation apparatus 100 includes an image division unit 21, an image processing unit 22, an integration unit 23, and a feature point extraction unit 24.

Figure 4:
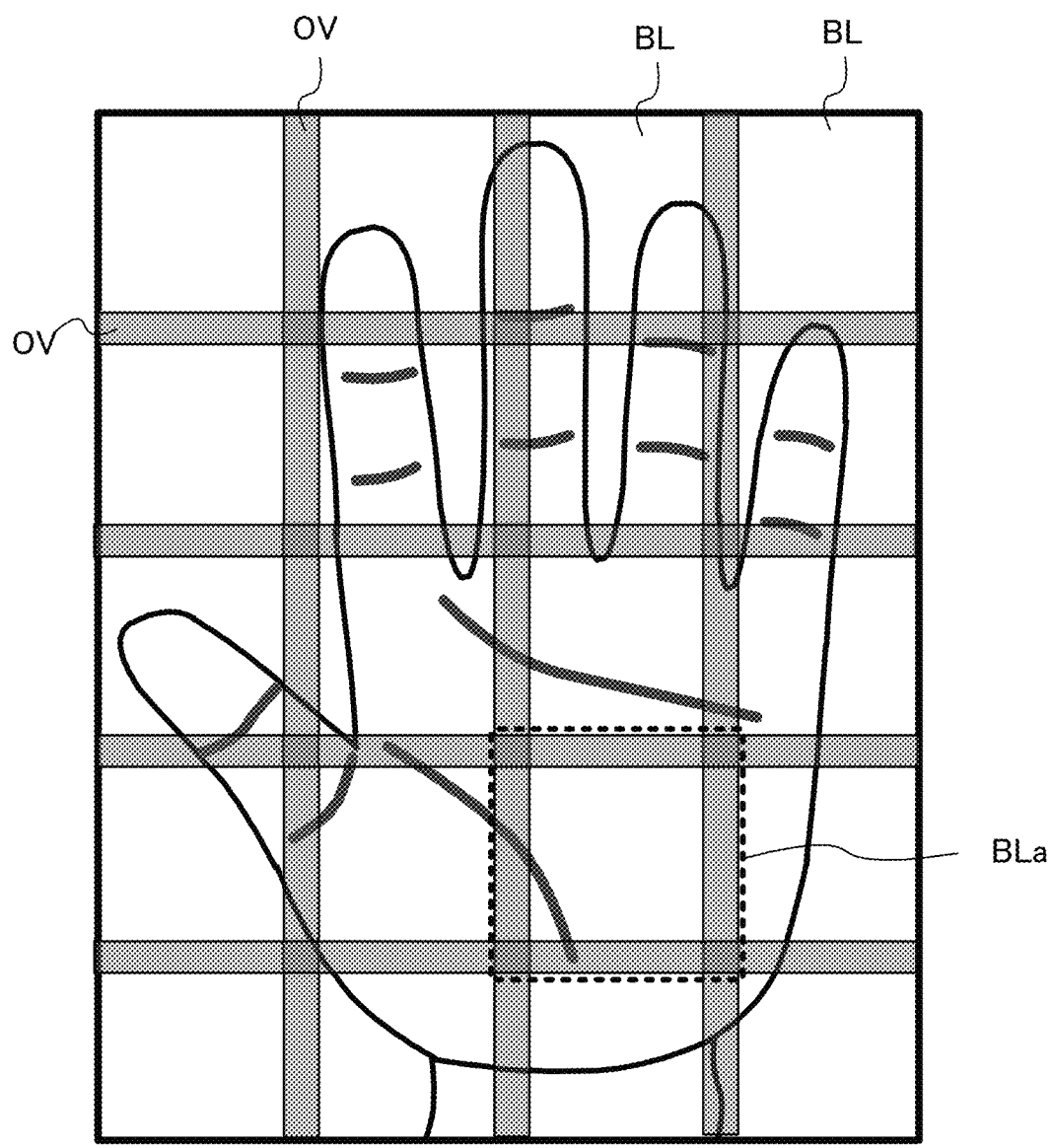
FIG. 4 illustrates an example for dividing a palm print image.

The image division unit 21 divides the input palm print image into a plurality of blocks. FIG. 4 illustrates an example for dividing a palm print image. The palm print image is an image of the entire palm of a person. The image division unit 21 divides the palm print image into rectangular blocks BL of a predetermined size (also referred to as "divisional images"). The size of each of divisional images BL corresponds to a size in which the image processing unit 22, which will be described later, uses as a unit of image processing. Here, since the image processing unit 22 uses the core line extraction model, which is originally trained to determine a valid region and to extract core lines with respect to the fingerprint image, it is preferable that the size of each of divisional images BL is an image size to be processed by the core line extraction model for fingerprints (hereinafter, simply referred to as a "fingerprint model"), that is, substantially the same size as a regular fingerprint image. The image division unit 21 outputs each of divisional images BL obtained by a division process to the image processing unit 22.

Here, as illustrated in FIG. 4, the image division unit 21 determines a region for each of divisional images BL so that adjacent divisional images BL have an overlapping region OV. In detail, the divisional image BL has a region including overlapping regions OV with adjacent divisional images BL surrounding the divisional image BL, as illustrated by the divisional image BLa of the broken line in FIG. 4. Note that, each of the divisional images BL located on an outer periphery (four sides) of the palm print image has an overlapping region OV in a direction other than the outer periphery of the palm print image. A reason for dividing the palm print image so as to include the overlapping region OV is to prevent a decrease in accuracy of an image processing at a subsequent stage in a peripheral portion of each of the divisional images BL. In general, the image processing uses adjacent pixels; however, there are no adjacent pixels at a peripheral portion (edge portion) of an image, and thus, the accuracy of the image processing is reduced. Therefore, the image division unit 21 divides the palm print image so as to provide the overlapping region OV between adjacent divisional images. Note that, a process will be described later in a case of integrating the divisional images to which the image processing has been performed.

The image processing unit 22 is an example of the image processing unit, and determines a valid region for each of divisional images BL, and performs the image processing for extracting core lines. As described above, the image processing unit 22 uses a trained model for fingerprints obtained by machine learning. That is, the fingerprint model is trained using fingerprint images and training data (correct answer data), which are obtained by correct answers which an experienced person gives with respect to the fingerprint image (that is, determination of the valid region and extraction of the core lines). This core extraction model can be generated by, for example, machine learning using a neural network, but is not limited thereto. The image processing unit 22 determines each valid region and extracts core lines using the trained fingerprint model.

The integration unit 23 integrates the divisional images BL after the image processing by the image processing unit 22, and generates an entire processed image corresponding to the entire original palm print image. In detail, the integration unit 23 integrates valid regions and core lines extracted by the image processing unit 22 for each of the divisional images BL, and generates the entire processed image representing the valid regions and the core lines corresponding to the entire original palm print image. Here, as described with reference to FIG. 4, the palm print image is divided so that each of adjacent divisional images has an overlapping region OV. Therefore, the integration unit 23 performs an integration process as follows with respect to respective divisional images and the overlapping regions OV.

Figure 5:
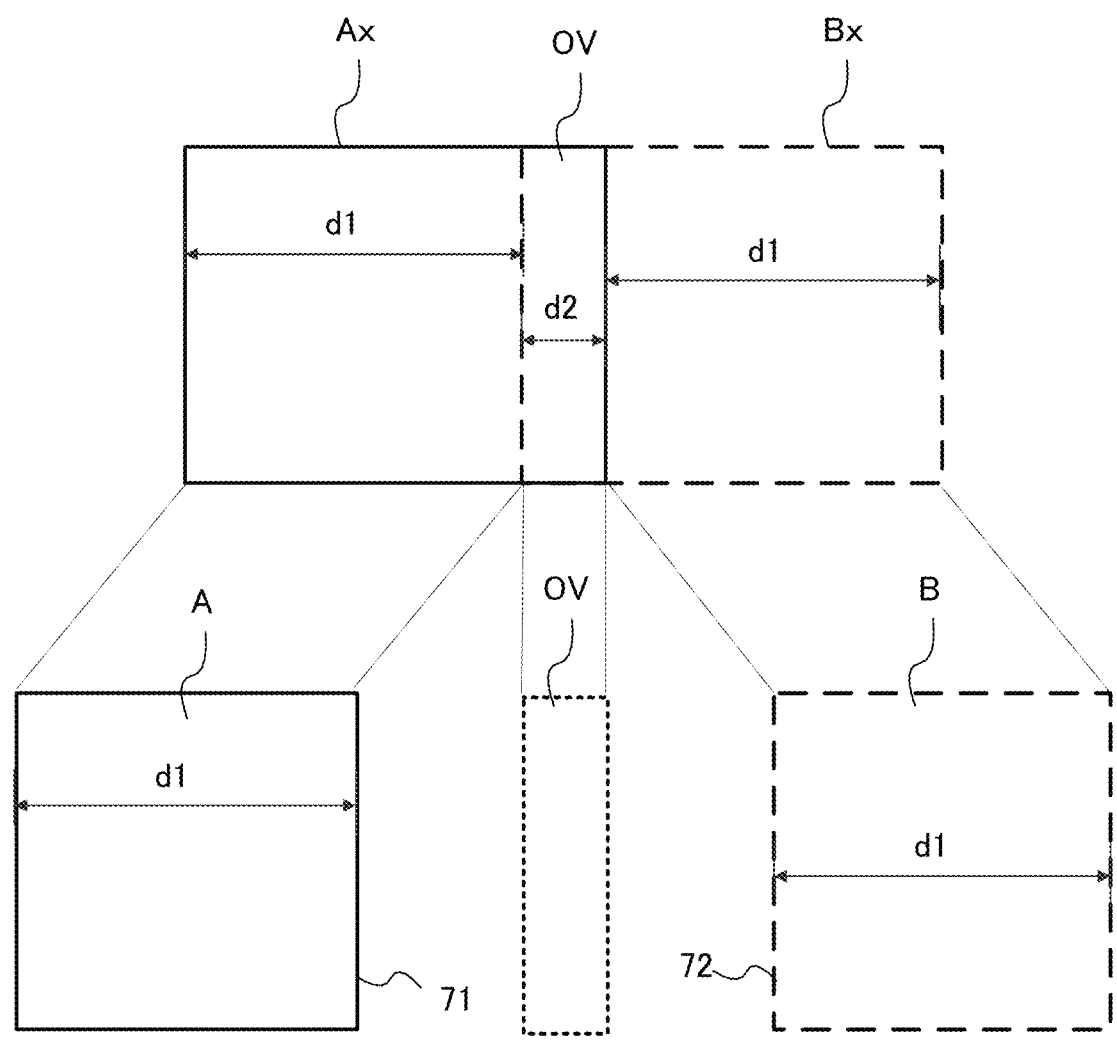
FIG. 5 schematically illustrates a positional relationship between two adjacent divisional images.

FIG. 5 schematically illustrates a positional relationship between two adjacent divisional images. Now, as illustrated in FIG. 5, it is assumed that there are two divisional images Ax and Bx adjacent to each other on left and right. The two divisional images Ax and Bx are generated to have a width d1 and to further include an overlapping region OV of a width d2. That is, the divisional image Ax at a left side is regarded as a divisional image of a width (d1+d2) in which the width d2 for an overlapping region is added to a region A having the width d1. In the same manner, the divisional image Bx at a right side is regarded as a divisional image of a divisional image of the width (d1+d2) in which the width d2 for the overlapping region is added to a region B having the width d1. Accordingly, the overlapping region OV of the width d2 is formed between the divisional image Ax and the divisional image Bx.

Although the image processing by the image processing unit 22 uses adjacent pixels, since there is no adjacent pixel at edges of the divisional image, the accuracy of the image processing is reduced. Therefore, in the example of FIG. 5, the region A which originally has the width d1 is enlarged by the width d2. Accordingly, for pixels along a right edge 71 of the region A, since the image processing uses pixels in the divisional image Ax enlarged to the right, that is, pixels in the overlapping region OV, it is possible to prevent reduction of accuracy. In the same manner, for pixels along a left edge 72 of the region B, the image processing uses pixels in the divisional image Bx enlarged to the left, that is, the pixels in the overlapping region OV, it is possible to prevent reduction of accuracy. Therefore, by using the divisional image Ax and Bx enlarged by the width d2 with respect to the regions A and B, it is possible to prevent reduction of accuracy of the image processing at edge portions. In detail, the integration unit 23 uses the valid regions and the core lines extracted by the image processing unit 22 using the divisional image Ax for the region A, and uses the valid region and the core lines extracted by the image processing unit 22 using the divisional image Bx for the region B.

On the other hand, with respect to the overlapping region OV, the integration unit 23 combines and uses the valid region and the core lines extracted by the image processing unit 22 using the divisional image Ax and the valid region and the core lines extracted by the image processing unit 22 using the divisional image Bx. In detail, in the image processing performed by the image processing unit 22, in a case of determining each valid region, the integration unit 23 may select a clearer one from among valid regions obtained by the divisional images Ax and Bx, specifically, one region having greater pixel values from regions defining the valid region. On the other hand, with respect to the extraction of the core lines, the integration unit 23 may use an average value of densities of the core lines extracted by the divisional images Ax and Bx.

Although FIG. 5 illustrates an example in which two divisional images overlap each other only in a horizontal direction for convenience of an explanation; however, there are actually divisional images BL adjacent to each divisional image BL in a plurality of directions (2 to 4 directions) as illustrated in FIG. 4. Therefore, the integration unit 23 performs the integration process as described above for the overlapping region OV present in each of directions. That is, as the determination of the valid region, the integration unit 23 may select a maximum value among pixel values that define the valid region obtained in each divisional image. In addition, for the extraction of the core lines, the integration unit 23 may use the average value of the densities of the core lines extracted in respective divisional images.

The feature point extraction unit 24 extracts feature points from the entire processed image which is integrated by the integration unit 23. In detail, the feature point extraction unit 24 extracts end points, branch points, and the like of the core lines included in the entire processed image as feature points, and outputs feature point data indicating positions and directions of the extracted feature points as palm print data to the palm print DB 3 in association with identification information of the palm print image.

[Palmprint Data Generation Process]

Figure 6:
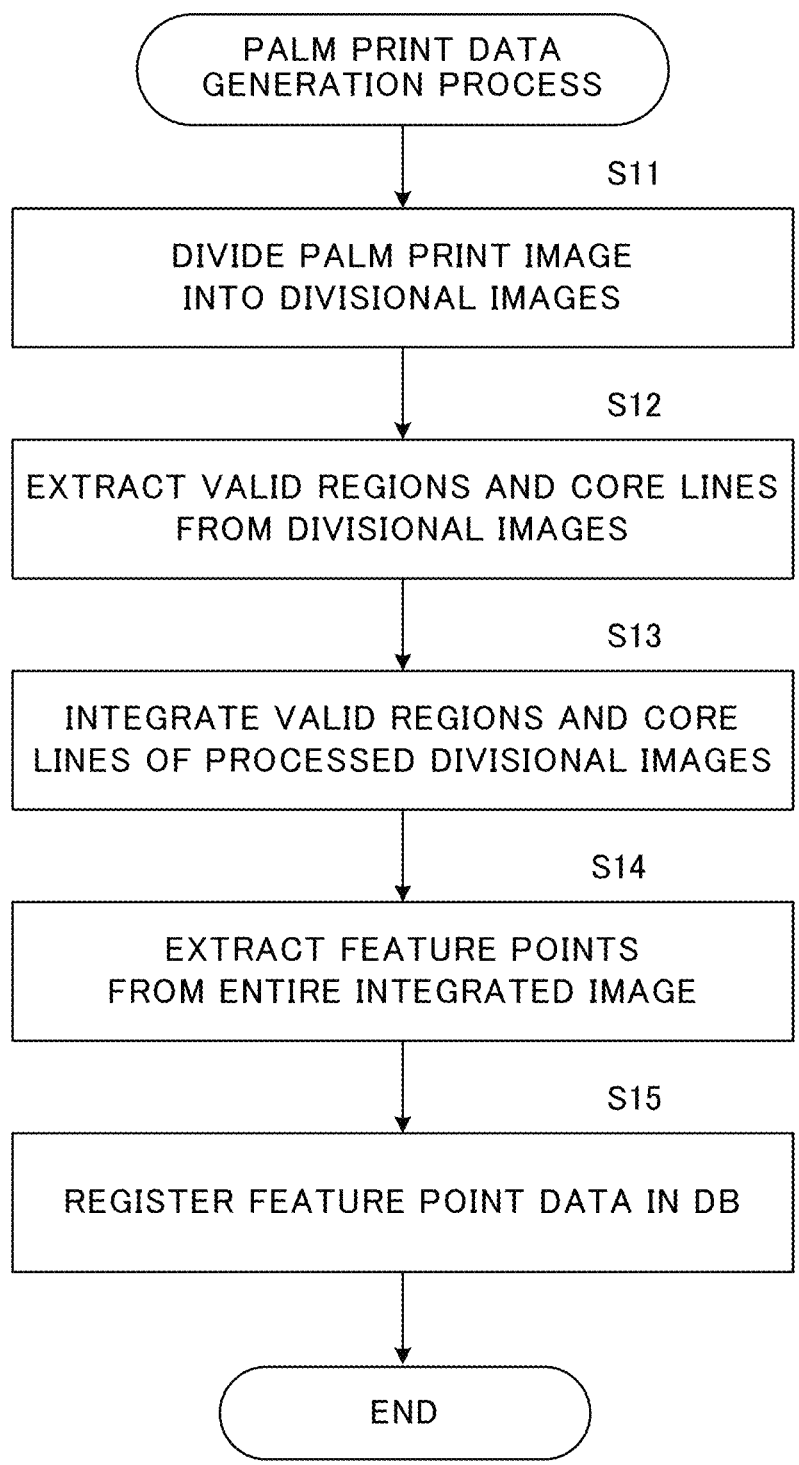
FIG. 6 is a flowchart of a palm print data generation process.

FIG. 6 is a flowchart of a palm print data generation process. This process is realized by the processor 12 illustrated in FIG. 2, which executes a program prepared in advance, and operates as each element illustrated in FIG. 3.

First, the image division unit 21 divides a palm print image being input, into a plurality of divisional images (step S11). Next, for each of the divisional images, the image processing unit 22 performs the image processing using the trained fingerprint model prepared in advance, and extracts a valid region and core lines (step S12). Note that, the image processing unit 22 performs image processing on all divisional images obtained from the palm print image, and outputs the processed divisional image obtained by extracting the valid region and the core lines to the integration unit 23.

Next, the integration unit 23 integrates all processed divisional images obtained from the palm print image, and generates the entire processed image corresponding to the entire palm print image (step S13). Subsequently, the feature point extraction unit 24 extracts feature points from the entire processed image corresponding to the entire palm print image, and generates the feature point data (step S14).

After that, the feature point extraction unit 24 registers the feature point data as palm print data in the palm print DB 3 (step S15). Accordingly, the palm print data for one palm print image are registered in the palm print DB 3.

[Modification of Characteristics of the Fingerprint Model]

Figure 7A:
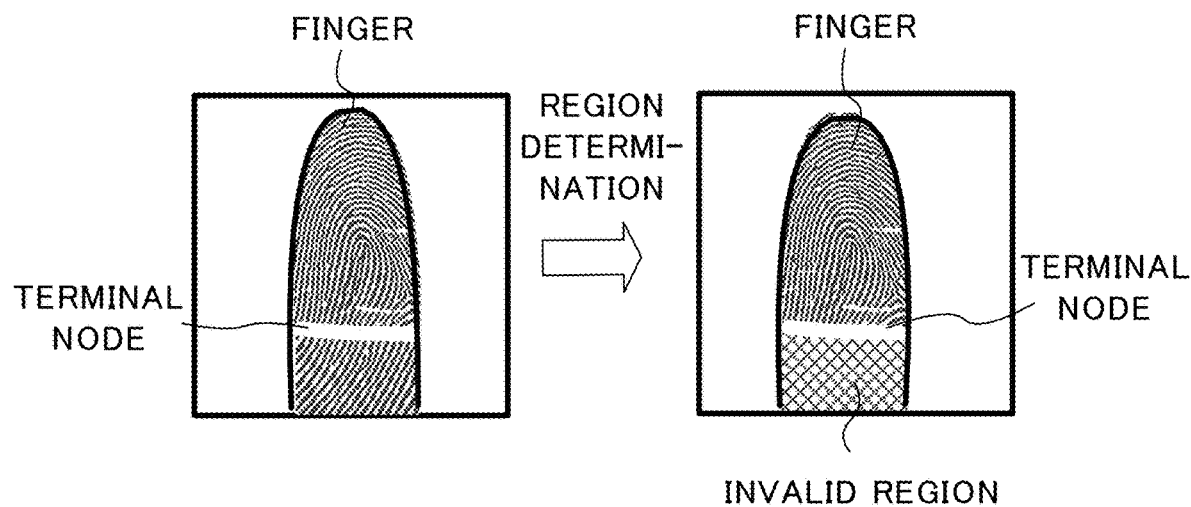
FIG. 7A and FIG. 7B illustrates an example of a region determination result by a fingerprint model.

Next, a process required in a case of using the fingerprint model will be described. In general, fingerprint verification uses only images above a first joint of a finger (the first joint counted from a tip of the finger; hereinafter, also referred to as a "terminal node"). That is, an image below the terminal node of the finger (a palm side) is not used. For this reason, the model for the fingerprint is usually trained to automatically determine a region below the terminal node as an invalid region. FIG. 7A illustrates an example of a region determination result of the fingerprint image by the fingerprint model. As illustrated, in a case where there is a linear region corresponding to the terminal node in the fingerprint image, the fingerprint model automatically determines a lower side of the fingerprint as an invalid region.

Figure 7B:
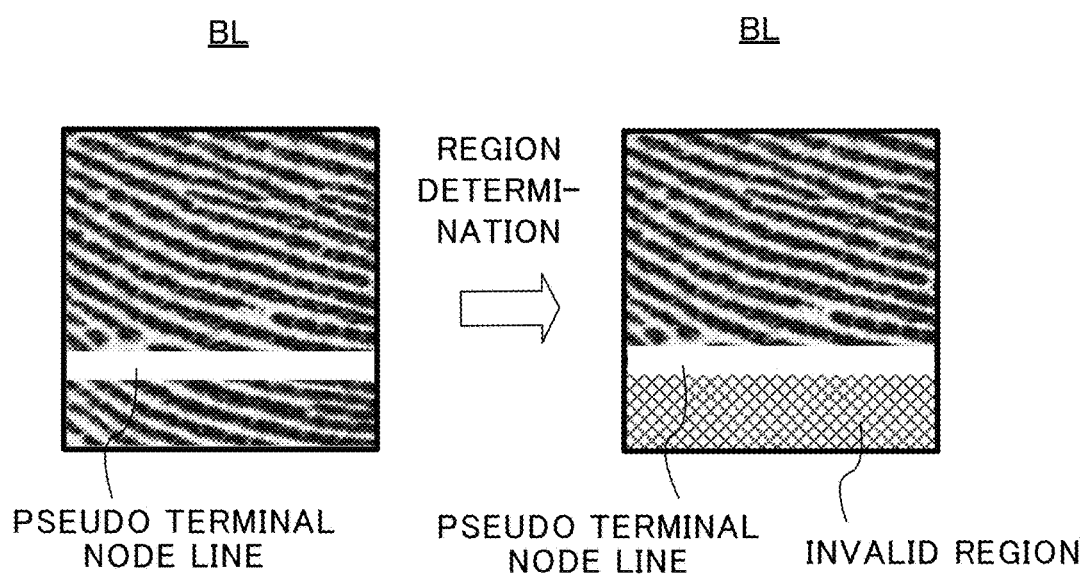

For this reason, in a case of inputting a divisional image of a palm print image to the fingerprint model, when a linear region similar to the terminal node (hereinafter, referred to as a "pseudo terminal node line") in the horizontal direction is included in the divisional image, the fingerprint model automatically determines a region at the lower side of the linear region as an invalid region, and may not extract core lines in that region. FIG. 7B illustrates an example of the region determination result of the divisional image of the palm print by the fingerprint model. In an example of FIG. 7B, since there is a pseudo terminal node line in the divisional image BL, all lower region than the pseudo terminal node line is determined to be an invalid region.

Figure 8A:
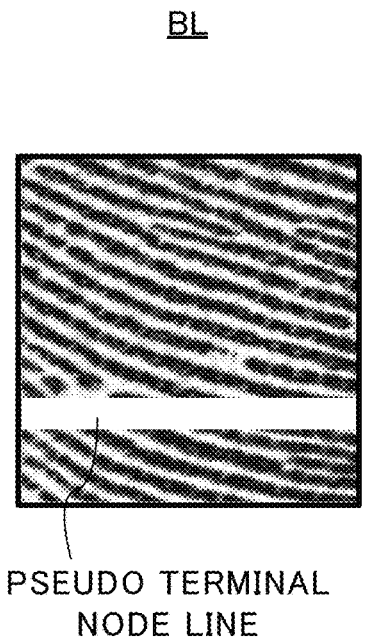
FIG. 8A through FIG. 8D illustrates an example of an image processing by rotating a divisional image.
Figure 8B:
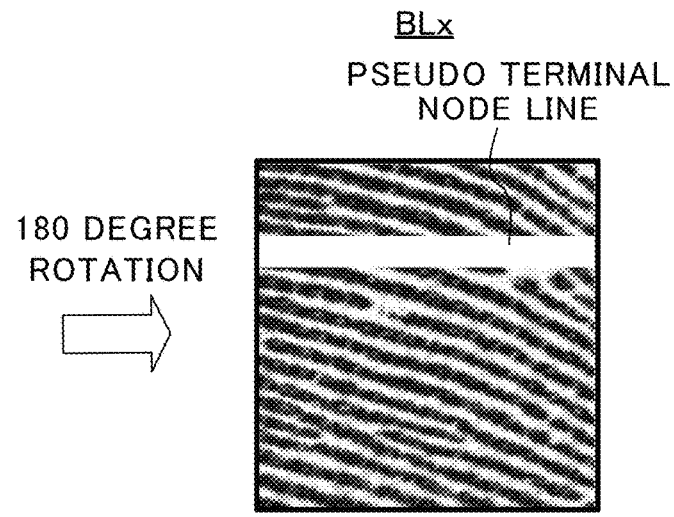
Figure 8C:
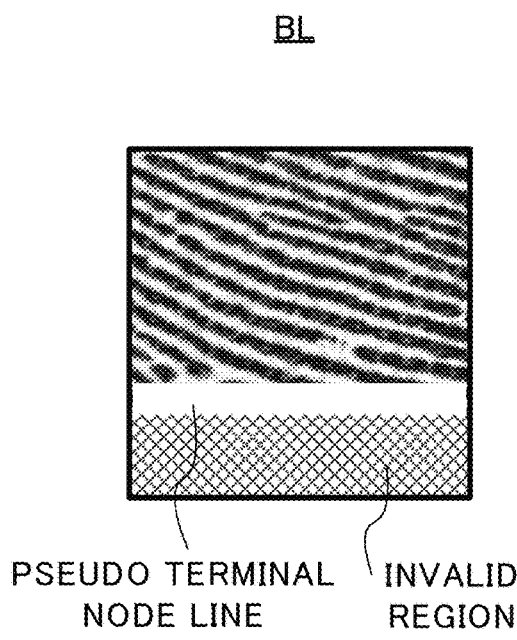
Figure 8D:
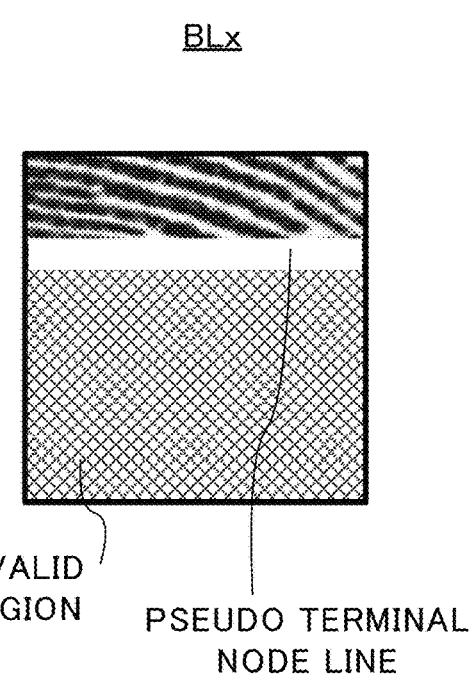

Accordingly, in the present example embodiment, an image (hereinafter, referred to as a "rotated image") is generated by rotating an original divisional image (hereinafter, also referred to as an "original image") by 180 degrees, and the image processing is also performed for the rotated image using the fingerprint model. FIG. 8A through FIG. 8D illustrate examples for explaining the image processing by rotating the divisional image. For the original image BL including the pseudo terminal node line as illustrated in FIG. 8A, the image processing unit 22 generates a rotated image BLx in which the original image BL is rotated by 180 degrees as illustrated in FIG. 8B. After that, as illustrated in FIG. 8C and FIG. 8D, the image processing unit 22 performs the region determination and the core line extraction with respect to each of the original image BL and the rotated image BLx using the fingerprint model. Accordingly, the fingerprint model determines a region at the lower side of the pseudo terminal node line in the original image BL as an invalid region as illustrated in FIG. 8C, and the region is the same as an upper region of the pseudo terminal node line in the rotated image BLx illustrated in FIG. 8D, and the fingerprint model determines the region as the valid region in the rotated image BLx. Hence, the image processing unit 22 may synthesize the valid region and the core lines obtained from the original image BL with the valid region and the core lines obtained from the rotation image BLx, and may define the synthesized valid region and he synthesized core lines as a valid region and core lines for the divisional image (original image). As described above, by also performing the region determination and the core line extraction for the rotation image, even in a case where the pseudo terminal node line is included in the divisional image BL, it is possible to correctly perform the region determination and the core line extraction. That is, it is possible to modify the characteristics of the fingerprint model that automatically defines a region below the terminal node line as an invalid region.

As specific methods, in a first method, the image processing unit 22 detects the pseudo terminal node line in the divisional image BL, performs the image processing for both the original image BL and the rotated image BLx when the pseudo terminal node line is included in the divisional image BL, and performs the image processing only for the original image BL when the pseudo terminal node line is not included in the divisional image BL. Basically, the pseudo terminal line has a lower concentration of a ridge than a surrounding, and can be detected as a linear region with an angle close to horizontal. Note that, what kind of a region in the divisional image is actually detected as a pseudo terminal node line may be determined by considering the characteristics of the fingerprint model to be used. On the other hand, as a second method, the image processing unit 22 does not detect presence or absence of the pseudo terminal node line in the divisional image BL, generates the rotated image BLx for each of divisional images BL, and performs region determination and core line extraction for both the original image BL and the rotated image BLx.

Figure 9A:
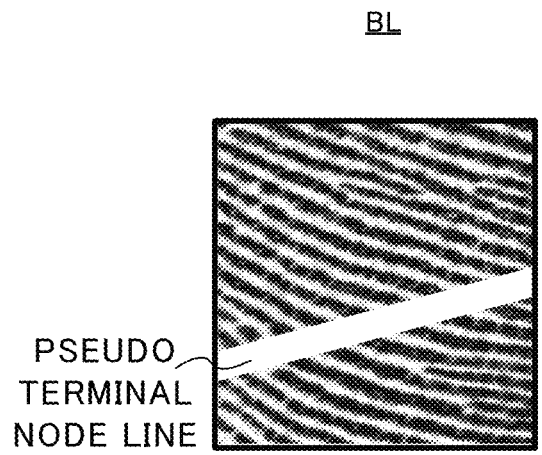
FIG. 9A through FIG. 9D illustrates examples of the image processing in a case of modifying an oblique pseudo terminal node line to be horizontal.
Figure 9B:
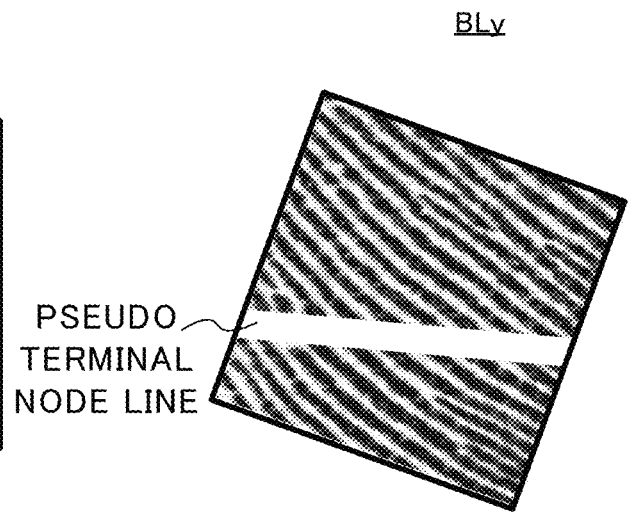
Figure 9C:
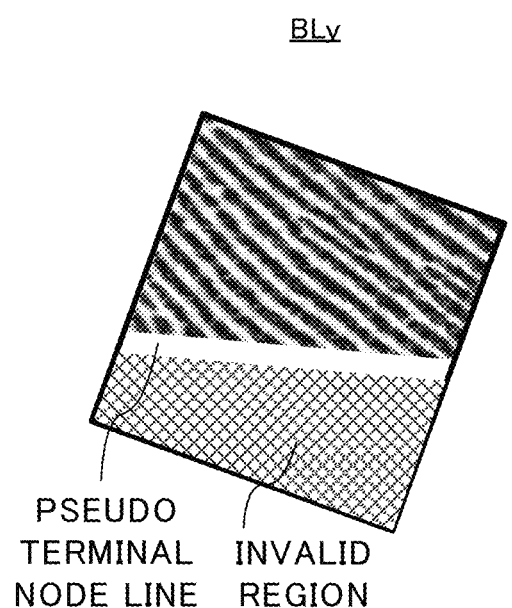
Figure 9D:
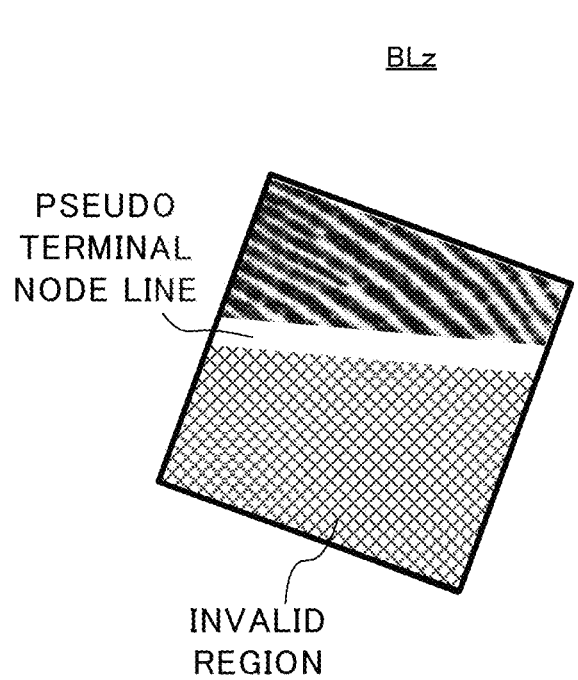

The pseudo terminal node line is basically a line having an angle close to horizontal; however, depending on the characteristics of the fingerprint model, it is possible that a diagonal linear region is determined as the pseudo terminal node line. In this case, a process may be performed to modifying an oblique pseudo terminal node line included in the divisional image BL to be horizontal. FIG. 9A and FIG. 9B illustrate examples of the image processing in a case of modifying an oblique pseudo terminal node line included in the divisional image BL to be horizontal. As illustrated in FIG. 9A, in a case where the divisional image BL includes an oblique pseudo terminal node line, the image processing unit 22 first generates the divisional image BLy by rotating the divisional image BL so that the pseudo terminal node line is horizontal as illustrated in FIG. 9B. Furthermore, the image processing unit 22 rotates the divisional image BLy by 180 degrees so as to generate a rotated image BLz. After that, the image processing unit 22 performs the region determination and the core line extraction for both the divisional image BLy and the rotated image BLz by using the fingerprint model. Accordingly, as illustrated in FIG. 9C, the valid region and the core lines above the pseudo terminal node line are obtained from the divisional image BLy. Furthermore, for the lower region of the divisional image BLy determined as the invalid region in FIG. 9C, the valid region and the core lines are acquired from the rotated image BLz as illustrated in FIG. 9D. Therefore, even in a case where the pseudo terminal node line is oblique, it is possible to correctly extract the valid region and the core lines from the divisional image BL.

As a specific process in this case, first, the image processing unit 22 detects the pseudo terminal node line from the divisional image BL, and determines whether or not the angle is within a predetermined angle range that can be regarded as horizontal. In a case where the pseudo terminal node line is within the predetermined angle range, the image processing unit 22 rotates the original image by 180 degrees as described above in the first method, and extracts the valid region and the core lines with respect to each of the original image and the rotated image. On the other hand, in a case where the pseudo terminal node line detected from the divisional image BL is oblique, that is, is inclined at an angle other than the above-described predetermined angle range, as illustrated in FIG. 9A, the image processing unit 22 first modifies the divisional image BL so that the pseudo terminal node line becomes horizontal, and then, extracts the valid region and the core lines with respect to the divisional image BLy and the rotation image BLZ.

Second Example Embodiment

Figure 10:
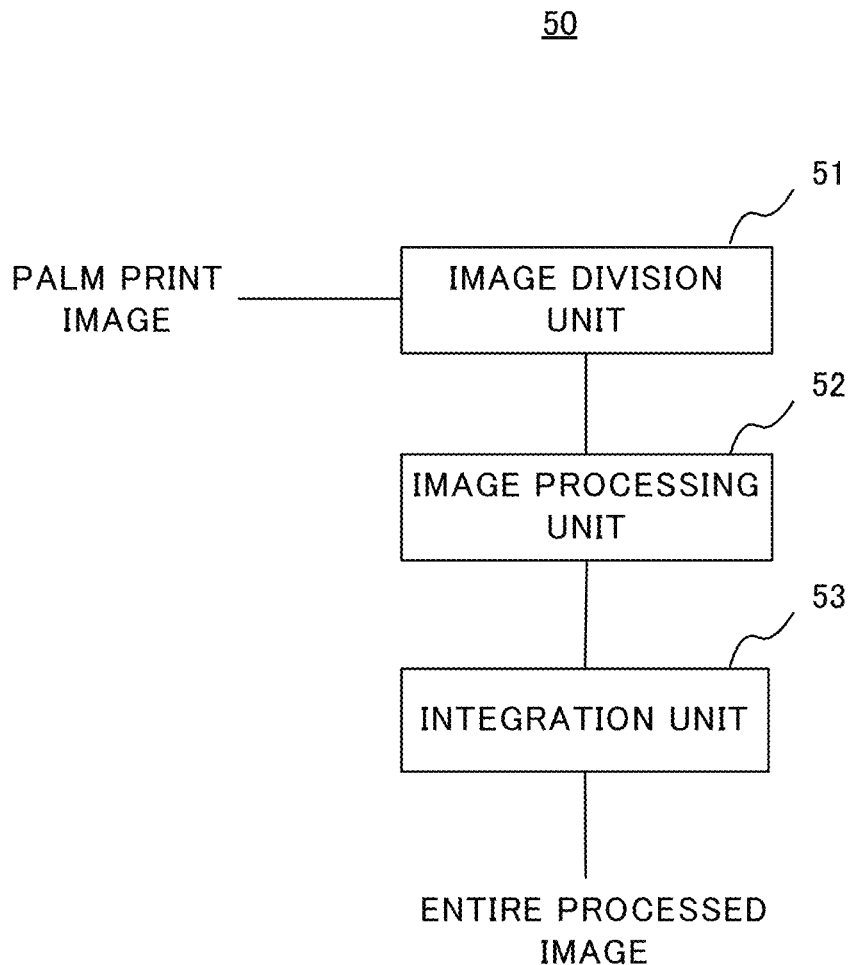
FIG. 10 is a block diagram illustrating a functional configuration of an image processing apparatus according to a second example embodiment.

FIG. 10 is a block diagram illustrating a functional configuration of an image processing apparatus 50 according to the second example embodiment. The image processing apparatus 50 includes an image division unit 51, an image processing unit 52, and an integration unit 53. The image division unit 51 divides a palm print image into a plurality of divisional images. The image processing unit 52 determines a valid region in each of the divisional images using a fingerprint model, performs the image processing for extracting core lines in the valid region, and generates respective processed divisional images corresponding to individual divisional images. The integration unit 53 integrates the processed divisional images, and generates the entire processed image corresponding to the entire palm print image.

A part or all of the example embodiments described above may also be described as the following supplementary notes, but not limited thereto.

(Supplementary Note 1)

1. An image processing apparatus comprising:
an image division unit configured to divide a palm print image into a plurality of divisional images;
an image processing unit configured to determine a valid region in each of the divisional images by using a fingerprint model, perform image processing that extracts core lines in each of valid regions, and generate respective processed divisional images corresponding to the divisional images; and
an integration unit configured to generate an entire processed image corresponding to an entire of the palm print image by integrating the processed divisional images.

(Supplementary Note 2)

2. The image processing apparatus according to supplementary note 1, wherein the fingerprint model is a model that determines the valid region in a fingerprint image and extracts core lines in the valid region.

(Supplementary Note 3)

3. The image processing apparatus according to supplementary note 1 or 2, wherein the image processing unit
generates a rotated image by rotating each divisional image by 180 degrees; and
synthesizes a first image acquired by the image processing with respect to the divisional image with a second image acquired by the image processing with respect to the rotated image, and generates the processed divisional images.

(Supplementary Note 4)

4. The image processing apparatus according to supplementary note 1 or 2, wherein the image processing unit
detects a pseudo terminal node line similar to a terminal node from the divisional image;
generates a first rotated image by rotating each divisional image so that the pseudo terminal node becomes horizontal;
generates a second rotated image by rotating the first rotated image; and
synthesizes a first image acquired by the image processing with respect to the first rotated image with a second image acquired by the image processing with respect to the second rotated image, and generates the processed divisional images.

(Supplementary Note 5)

5. The image processing apparatus according to any one of supplementary notes 1 through 4, wherein
the image division unit divides the palm print image into the plurality of divisional images in order for adjacent divisional images to have an overlapping region; and
the image processing unit determines an average value of densities of respective core lines of the plurality of divisional images forming overlapping regions to be densities of core lines in each of the overlapping regions.

(Supplementary Note 6)

6. The image processing apparatus according to any one of supplementary notes 1 through 5, wherein
the image division unit divides the palm print image into a plurality of divisional images in order for adjacent divisional images to have an overlapping region; and
the image processing unit determines a valid region having a maximum pixel value among respective valid regions in the plurality of divisional images each forming the overlapping region.

(Supplementary Note 7)

7. The image processing apparatus according to any one of supplementary notes 1 through 6, further comprising a feature point extraction unit configured to extract feature points from the entire processed image, and output feature point data.

(Supplementary Note 8)

8. An image processing method, comprising:
dividing a palm print image into a plurality of divisional images;
determining a valid region in each of the divisional images by using a fingerprint model, performing image processing that extracts core lines in each of valid regions, and generating respective processed divisional images corresponding to the divisional images; and
generating an entire processed image corresponding to an entire of the palm print image by integrating the processed divisional images.

(Supplementary Note 9)

9. A recording medium storing a program, the program causing a computer to perform a process comprising:
dividing a palm print image into a plurality of divisional images;
determining a valid region in each of the divisional images by using a fingerprint model, performing image processing that extracts core lines in each of valid regions, and generating respective processed divisional images corresponding to the divisional images; and
generating an entire processed image corresponding to an entire of the palm print image by integrating the processed divisional images.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS

3 Palm print database
21, 51 Image division unit 22, 52 Image processing unit
23, 53 Integration unit
24 Feature point extraction unit
100 Palm print data generation apparatus

What is claimed is:

1. An image processing apparatus comprising:
a memory storing instructions; and
one or more processors configured to execute the instructions to:
divide a palm print image into a plurality of divisional images;
determine a valid region in each of the divisional images by using a fingerprint model, perform image processing that extracts core lines in each of valid regions, and
generate respective processed divisional images corresponding to the divisional images; and
generate an entire processed image corresponding to an entire of the palm print image by integrating the processed divisional images,
wherein the one or more processors
generate a rotated image by rotating each divisional image by 180 degrees; and
synthesize a first image acquired by the image processing with respect to the divisional image with a second image acquired by the image processing with respect to the rotated image, and generates the processed divisional images.

2. The image processing apparatus according to claim 1, wherein the fingerprint model is a model that determines the valid region in a fingerprint image and extracts core lines in the valid region.

3. The image processing apparatus according to claim 1, wherein the one or more processors
detect a pseudo terminal node line similar to a terminal node from the divisional image;
generate a first rotated image by rotating each divisional image so that the pseudo terminal node becomes horizontal;
generate a second rotated image by rotating the first rotated image; and
synthesize a first image acquired by the image processing with respect to the first rotated image with a second image acquired by the image processing with respect to the second rotated image, and generates the processed divisional images.

4. The image processing apparatus according to claim 1, wherein the one or more processors
divide, in dividing the palm print mage, the palm print image into the plurality of divisional images in order for adjacent divisional images to have an overlapping region; and
determine, in the image processing, an average value of densities of respective core lines of the plurality of divisional images forming overlapping regions to be densities of core lines in each of the overlapping regions.

5. The image processing apparatus according to claim 1, wherein the one or more processors
divide, in dividing the palm print image, the palm print image into a plurality of divisional images in order for adjacent divisional images to have an overlapping region; and
determine, in the image processing, a valid region having a maximum pixel value among respective valid regions in the plurality of divisional images each forming the overlapping region.

6. The image processing apparatus according to claim 1, wherein the one or more processors are further configured to extract feature points from the entire processed image, and output feature point data.

7. An image processing method performed by a computer having one or more processors, the image processing method comprising:
dividing a palm print image into a plurality of divisional images;
determining a valid region in each of the divisional images by using a fingerprint model, performing image processing that extracts core lines in each of valid regions, and generating respective processed divisional images corresponding to the divisional images; and
generating an entire processed image corresponding to an entire of the palm print image by integrating the processed divisional images,
wherein the one or more processors
generate a rotated image by rotating each divisional image by 180 degrees; and
synthesize a first image acquired by the image processing with respect to the divisional image with a second image acquired by the image processing with respect to the rotated image, and generates the processed divisional images.

8. A non-transitory computer-readable recording medium storing a program executable by a computer having one or more processors to perform a process comprising:
dividing a palm print image into a plurality of divisional images;
determining a valid region in each of the divisional images by using a fingerprint model, performing image processing that extracts core lines in each of valid regions, and generating respective processed divisional images corresponding to the divisional images; and
generating an entire processed image corresponding to an entire of the palm print image by integrating the processed divisional images,
wherein the one or more processors
generate a rotated image by rotating each divisional image by 180 degrees; and
synthesize a first image acquired by the image processing with respect to the divisional image with a second image acquired by the image processing with respect to the rotated image, and generates the processed divisional images.

* * * * *